US012292109B2

United States Patent
Kniel et al.

(10) Patent No.: US 12,292,109 B2
(45) Date of Patent: May 6, 2025

(54) HYDRAULIC ASSEMBLY

(71) Applicant: Schaeffler Technologies AG & Co. KG, Herzogenaurach (DE)

(72) Inventors: Jonas Kniel, Karlsruhe (DE); Michael Heilmann, Karlsruhe (DE); Maximilian Flack, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/684,259

(22) PCT Filed: Aug. 2, 2022

(86) PCT No.: PCT/DE2022/100558
§ 371 (c)(1),
(2) Date: Feb. 16, 2024

(87) PCT Pub. No.: WO2023/020651
PCT Pub. Date: Feb. 23, 2023

(65) Prior Publication Data
US 2024/0360900 A1    Oct. 31, 2024

(30) Foreign Application Priority Data
Aug. 19, 2021    (DE) .......................... 102021121555.2

(51) Int. Cl.
*F16H 57/04*    (2010.01)
*H02K 7/116*    (2006.01)
(Continued)

(52) U.S. Cl.
CPC ..... *F16H 57/0476* (2013.01); *F16H 57/0415* (2013.01); *F16H 57/0436* (2013.01);
(Continued)

(58) Field of Classification Search
CPC ...... H02K 9/19; B60K 2001/006; B60K 1/00; B60K 11/02; F16H 57/0476
See application file for complete search history.

(56) References Cited

U.S. PATENT DOCUMENTS

| 8,127,564 | B2 * | 3/2012 | Takamatsu | ............ B60L 3/0053 |
| | | | | 62/239 |
| 10,778,068 | B2 * | 9/2020 | Murakami | ............. H02K 9/197 |

(Continued)

FOREIGN PATENT DOCUMENTS

| DE | 102005054084 A1 | 7/2007 |
| DE | 102010054868 A1 | 6/2012 |

(Continued)

OTHER PUBLICATIONS

German automotive magazine ATZ, vol. 113, May 2011, pp. 360-365 by Erik Schneider, Frank Fickl, Bernd Cebulski and Jens Liebold with the title: Hochintegrativ und Flexibel Elektrische Antriebseinheit für E-Fahrzeuge [Highly Integrative and Flexible Electric Drive Unit for E-Vehicles].

*Primary Examiner* — Sherry L Estremsky
(74) *Attorney, Agent, or Firm* — Volpe Koenig (57) ABSTRACT

A hydraulic assembly of an electrically operable axle drive train having at least one electric machine and having a control unit, the hydraulic assembly including a first hydraulic pump for conveying a first hydraulic fluid from a hydraulic reservoir into a first hydraulic path, which is coupled to a first hydraulic connection point of a first switching valve, wherein the switching valve has a second hydraulic connection point, which is coupled to a second hydraulic path, the second hydraulic path connecting the second hydraulic connection point to a first cooling fluid connection point of the electric machine, and the electric machine including a second cooling fluid connection point, which is connected to a third hydraulic path coupled to a third connection point of (Continued)

the first switching valve, and wherein the first switching valve has a fourth hydraulic connection point, which is coupled to a fourth hydraulic path leading into the hydraulic reservoir.

18 Claims, 10 Drawing Sheets

(51) Int. Cl.
  *H02K 9/19* (2006.01)
  *B60K 1/00* (2006.01)
(52) U.S. Cl.
  CPC ......... *F16H 57/0482* (2013.01); *H02K 7/116* (2013.01); *H02K 9/19* (2013.01); *B60K 2001/006* (2013.01)

(56) References Cited

U.S. PATENT DOCUMENTS

| | | | | |
|---|---|---|---|---|
| 2021/0006132 A1* | 1/2021 | Steinz | ................ | F16H 57/0417 |
| 2022/0295675 A1* | 9/2022 | Katayama | .......... | H05K 7/20945 |

FOREIGN PATENT DOCUMENTS

| | | | | |
|---|---|---|---|---|
| DE | 102015201454 A1 | | 7/2016 | |
| DE | 102018201526 A1 | | 8/2019 | |
| DE | 102019117637 A1 | | 1/2021 | |
| DE | 102019129249 A1 | | 5/2021 | |
| DE | 102021119594 A1 | * | 2/2023 | ............. B60K 11/02 |
| EP | 1785646 B1 | | 5/2007 | |
| JP | 2006315505 A | | 11/2006 | |
| JP | 2014088167 A | | 5/2014 | |

\* cited by examiner

HYDRAULIC ASSEMBLY

CROSS-REFERENCE TO RELATED APPLICATIONS

This application is the U.S. National Phase of PCT Appln. No. PCT/DE2022/100558, filed Aug. 2, 2022, which claims the benefit of German Patent Appln. No. 102021121555.2, filed Aug. 19, 2021, the entire disclosures of which are incorporated by reference herein.

TECHNICAL FIELD

The present disclosure relates to a hydraulic assembly of an electrically operable axle drive train having at least one electric machine and having a control unit.

BACKGROUND

Electric motors are increasingly being used to drive motor vehicles in order to create alternatives to internal combustion engines that require fossil fuels. Significant efforts have already been made to improve the suitability of electric drives for everyday use and also to be able to offer users the driving comfort they are accustomed to.

A detailed description of an electric drive can be found in an article in the German automotive magazine ATZ, Volume 113, May/2011, pages 360-365 by Erik Schneider, Frank Fickl, Bernd Cebulski and Jens Liebold with the title: *Hochintegrativ und Flexibel Elektrische Antriebseinheit für E-Fahrzeuge* [Highly Integrative and Flexible Electric Drive Unit for E-Vehicles]. This article describes a drive unit for an axle of a vehicle, which comprises an electric motor that is arranged to be concentric and coaxial with a bevel gear differential, wherein a shiftable 2-speed planetary gear set is arranged in the power train between the electric motor and the bevel gear differential and is also positioned to be coaxial with the electric motor or the bevel gear differential or spur gear differential. The drive unit is very compact and allows for a good compromise between climbing ability, acceleration and energy consumption due to the shiftable 2-speed planetary gear set. Such drive units are also referred to as e-axles or electrically operable drive trains.

In addition to purely electrically operated drive trains, hybrid drive trains are also known. Such drive trains of a hybrid vehicle usually comprise a combination of an internal combustion engine and an electric motor, and enable—for example in urban areas—a purely electric mode of operation with both sufficient range and availability, in particular when driving overland. In addition, there is the possibility of driving the internal combustion engine and the electric motor at the same time in certain operating situations.

In the development of electric machines intended for e-axles or hybrid modules, there exists a continuing need to increase their power densities, so that the cooling of the electric machines required for this is becoming increasingly important. Due to the necessary cooling capacities, hydraulic fluids such as cooling oils have become established in most concepts for the removal of heat from the thermally loaded areas of an electric machine.

At the same time, transmission arrangements in e-axles or hybrid modules require sufficiently good lubrication in order to not only provide cooling of the thermally stressed components but also to ensure low friction losses of the transmission arrangement. Planetary gearings are often used in transmission arrangements used in e-axles or hybrid modules, for example also as differential gears.

The structure of a planetary drive in a motor vehicle transmission comprises at least one planetary gear set, in which planetary gears are rotatably arranged on a planetary gear bolt in a rolling or sliding manner, which is accommodated in a planetary carrier. Effective lubrication of the planetary gear bearing and the dissipation of frictional heat are crucial for the long-term function of the planetary gearing and to ensure it has a long service life. An oil is supplied as a lubricant, in particular from the direction of an input or output shaft arranged centrally in the planetary drive, preferably by centrifugal force via oil channels or bores of the planetary gear bearing.

DE 10 2010 054 868 A1 shows a planetary gearing that can be used as a differential, preferably as an axle differential. To lubricate the planetary gear bearing, the planetary gear bolt includes a lubricating oil channel designed as a stepped bore, from which the lubricating oil flows through radial bores to the planetary gear bearing. A targeted supply of lubricating oil is ensured by means of an oil collecting tray inserted into the lubricating oil channel on the inlet side.

According to DE 10 2005 054 084 A1, the planetary gear carrier of a planetary gearing comprises an oil collecting ring which forms a channel profile, the opening of which is aligned with the rotational axis of the planetary gear carrier. Several oil guide channels are provided on the channel profile on the side of the oil collecting ring facing the planetary gear carrier, via which the oil is guided from the channel profile to the planetary gear bearing.

Furthermore, from DE 199157 A1 a lubricant supply by means of centrifugal force for lubricating the planetary gear bearing is known. The oil is introduced into a central bore of the planetary gear bolt via an oil collecting device and from there reaches the planetary gear bearing via radial openings.

The patent EP 178 56 46 B1 shows a section of an automatic transmission intended for a motor vehicle, which comprises a planetary gearing with a planet carrier. Planetary gears are rotatably mounted on planetary gear bolts fixed in the planet carrier. An oil catch pan has a radial, disc-shaped section which merges radially on the outside into a groove, from which a socket is connected, which engages in a receptacle of the planetary gear bolt. The oil entering the planetary gear bolt is directed via a cross bore to the bearing point of the planetary gear on the respective planetary gear bolt.

DE 10 2015 201 454 A1 discloses a directional control valve for reversing the flow of a cooling circuit.

There is a continuing need to make the cooling and/or lubrication in an electrically operated axle drive train of a motor vehicle as efficient and at the same time cost-effective as possible.

SUMMARY

The object of the disclosure is therefore to eliminate this existing contradiction and to provide a hydraulic assembly of an electrically operable axle drive train, which allows the most efficient cooling and/or lubrication of an electrically operable axle drive train.

This object is achieved by a hydraulic assembly of an electrically operable axle drive train having at least one electric machine and having a control unit, the hydraulic assembly comprising a first hydraulic pump for conveying a first hydraulic fluid from a hydraulic reservoir into a first hydraulic path, which is coupled to a first hydraulic connection point of a first switching valve, wherein the switching valve has a second hydraulic connection point, which is coupled to a second hydraulic path, the second hydraulic path connecting the second hydraulic connection point to a first cooling fluid connection point of the electric ma-chine, and the electric machine comprising a second cooling fluid connection point, which is connected to a third hydraulic path coupled to a third connection point of the first switching valve, and wherein the first switching valve has a fourth hydraulic connection point, which is coupled to a fourth hydraulic path leading into the hydraulic reservoir, wherein the first switching valve can be moved via the control unit into a first operating position, in which the first hydraulic connection is hydraulically connected to the second hydraulic connection point and the third hydraulic connection point is hydraulically connected to the fourth hydraulic connection point, and the first switching valve can be moved via the control unit into a second operating position, in which the first hydraulic connection point is hydraulically connected to the third hydraulic connection point.

The hydraulic assembly according to the disclosure thus allows the direction of the hydraulic fluid to be reversed through the corresponding hydraulic paths without having to resort to a reversing or bidirectional pump.

Furthermore, thermal hot spots in the hydraulic paths can be effectively prevented or mitigated by the possibility of reversing the direction of flow of the hydraulic fluid, since the reversal of direction can bring about a homogenization of the cooling performance.

Finally, it is also possible to implement a heating function in addition to a cooling function by reversing the direction, for example in order to bring a component located in a hydraulic path to a desired operating temperature as quickly as possible. This is important, for example, for transmission arrangements in the warm-up phase, in which the hydraulic fluid is still comparatively highly viscous.

A hydraulic path of the hydraulic assembly according to the disclosure can be designed, for example, as an open or closed channel, as a pipeline, hose and/or as a hydraulic flow path, spray path, splash path or the like.

The individual elements of the claimed subject matter of the disclosure will be explained first, in the order in which they are named in the claims, and then particularly preferred embodiments of the subject matter of the disclosure will be described.

An electric axle drive train of a motor vehicle may comprise at least one electric machine and at least one transmission arrangement, wherein the electric machine and the transmission arrangement preferably in each case form a structural unit. The electric axle drive train preferably has a first electric machine with a first transmission arrangement and a second electric machine with a second transmission arrangement.

It can in particular be provided for an electric machine and a transmission arrangement in each case to be arranged in a common drive train housing. Alternatively, it would of course also be possible for the electric machine to have a motor housing and the gearing to have a gear housing, wherein the structural unit can then be brought about by fixing the transmission arrangement in relation to the electric machine. This structural unit is sometimes also referred to as an e-axle.

The electric machines and transmission arrangements may also be housed in each case or jointly in a drive train housing. The drive train housing is provided at least to accommodate the electric machine and the transmission arrangement. The drive train housing is preferably formed from a metallic material, particularly preferably from aluminum, gray cast iron or cast steel, in particular by means of a primary shaping process such as casting or die-casting. In principle, however, it would also be possible to form the drive train housing from a plastics material.

In the context of the disclosure, the electric machine can be configured as a radial or axial flux machine. To form an axially particularly compact axle drive train, preference should be given to axial flux machines. The electric machine is intended in particular for use within an electrically operable drive train of a motor vehicle.

In particular, the electric machine is dimensioned such that vehicle speeds of more than 50 km/h, preferably more than 80 km/h and in particular more than 100 km/h can be achieved. The electric motor particularly preferably has an output of more than 30 KW, preferably more than 50 KW and in particular more than 70 KW. Furthermore, it is preferred that the electric machine provides speeds greater than 5,000 rpm, particularly preferably greater than 10,000 rpm, very particularly preferably greater than 12,500 rpm.

The transmission arrangement of the electric axle drive train is, in particular, couplable to the electric machine, which is designed to generate a drive torque for the motor vehicle. The drive torque is particularly preferably a main drive torque, such that the motor vehicle is driven exclusively by the drive torque.

The transmission arrangement may comprise differential gearing. Differential gearing is planetary gearing with one input and two outputs. It usually has the function of driving two vehicle wheels of a motor vehicle in such a way that they can turn at different speeds when cornering, but with the same tractive power.

A control unit, as used in the present disclosure, serves in particular in open- and/or closed-loop electronic control of one or more technical systems of a motor vehicle. In particular, a control unit can be provided for controlling and/or regulating one or more hydraulic assemblies with one or more hydraulic pumps and one or more switching valves.

A control unit has, in particular, a wired or wireless signal input for receiving in particular electrical signals, such as sensor signals for example. Furthermore, a control unit likewise preferably has a wired or wireless signal output for the transmission of, in particular, electrical signals, for example to electrical actuators or electrical consumers of the motor vehicle.

Open-loop control operations and/or closed-loop control operations can be carried out within the control unit. It is very particularly preferable that the control unit comprises hardware that is designed to run software. The control unit preferably comprises at least one electronic processor for executing program sequences defined in software.

The control unit can also have one or more electronic memories in which the data contained in the signals transmitted to the control unit can be stored and read out again. Furthermore, the control unit can have one or more electronic memories in which data can be stored in a modifiable and/or non-modifiable manner.

A control unit can comprise a plurality of control devices which are arranged in particular spatially separate from one another in the motor vehicle. Control devices are also referred to as electronic control units (ECU) or electronic control modules (ECM) and preferably have electronic microcontrollers for carrying out computing operations for processing data, particularly preferably using software. The control devices can preferably be networked with one another such that wired and/or wireless data exchange between control devices is made possible. In particular, it is also possible to network the control devices with one another via bus systems present in the motor vehicle, such as a CAN bus or LIN bus for example.

According to an advantageous embodiment of the disclosure, it can be provided that a second switching valve which can be actuated via the control unit is arranged in the third hydraulic path, which in a first operating position loops through the third hydraulic path, and in a second operating position couples the third hydraulic path to a fifth hydraulic path, in which a heat exchanger is arranged. The advantage of this configuration is that this allows faster heat dissipation or supply to be achieved, which further improves the control or regulation dynamics of the thermal management of the hydraulic assembly.

According to a further preferred development of the disclosure, it can also be provided that a fifth hydraulic connection point is formed at the first switching valve, to which a sixth hydraulic path is connected, wherein the sixth hydraulic path is connected to a first cooling fluid connection point of a transmission arrangement, and a second cooling fluid connection point of the transmission arrangement is coupled to a seventh hydraulic path, which opens into the hydraulic reservoir, wherein the first switching valve can be moved via the control unit into a second operating position, in which the first hydraulic connection point is hydraulically connected to the third hydraulic connection point and the second hydraulic connection point is hydraulically connected to the fifth hydraulic connection point. It can thereby be achieved that a transmission arrangement of the axle drive train can also be included in the thermal management of the axle drive train by means of the hydraulic assembly.

Furthermore, according to a similarly advantageous embodiment of the disclosure, it can be provided that the first switching valve can be moved via the control unit into a third operating position, in which the first hydraulic connection point is hydraulically connected to the second hydraulic connection point and the third hydraulic connection point is hydraulically connected to the fifth hydraulic connection point. The advantageous effect of this configuration is that a reversal of direction of the hydraulic fluid is made possible, even in the presence of a transmission arrangement, which further expands the flexibility of the thermal management in the axle drive train via the hydraulic assembly.

According to a further particularly preferred embodiment of the disclosure, it can be provided that the heat exchanger is connected to a cooling water circuit, whereby a particularly good cooling performance can be achieved. The cooling water circuit can, for example, be a cooling water circuit that is already present in a motor vehicle.

Furthermore, the disclosure can also be further developed in that the transmission arrangement is a planetary gearing.

In a similarly preferred embodiment variant of the disclosure, it can also be provided that the control unit is configured to move the hydraulic assembly into a first operating mode, in which the first switching valve is moved into its first operating position and the second switching valve is moved into its first operating position.

It can also be advantageous to further develop the disclosure in such a way that the control unit is configured to move the hydraulic assembly into a second operating mode, in which the first switching valve is moved into its first operating position and the second switching valve is moved into its second operating position.

According to a further preferred embodiment of the subject matter of the disclosure, it can be provided that the control unit is configured to move the hydraulic assembly into a third operating mode, in which the first switching valve is moved into its second operating position and the second switching valve is moved into its first operating position.

The disclosure can also be advantageously designed in such a way that the control unit is configured to move the hydraulic assembly into a fourth operating mode, in which the first switching valve is moved into its second operating position and the second switching valve is moved into its second operating position.

Furthermore, it may be advantageous to implement the disclosure in such a way that the control unit is configured to move the hydraulic assembly into a fifth operating mode, in which the first switching valve is moved into its third operating position and the second switching valve is moved into its first operating position.

Finally, it may further be preferred that the control unit is configured to move the hydraulic assembly into a sixth operating mode, in which the first switching valve is moved into its third operating position and the second switching valve is moved into its second operating position.

It can be seen that a very flexible and efficient thermal management can be implemented in an electrically operated axle drive train due to the up to six different operating modes that can be implemented with the hydraulic assembly according to the disclosure.

BRIEF DESCRIPTION OF THE DRAWINGS

The disclosure will be explained in more detail below with reference to figures without limiting the general concept of the disclosure.

In the figures.

DETAILED DESCRIPTION

Figure 1:
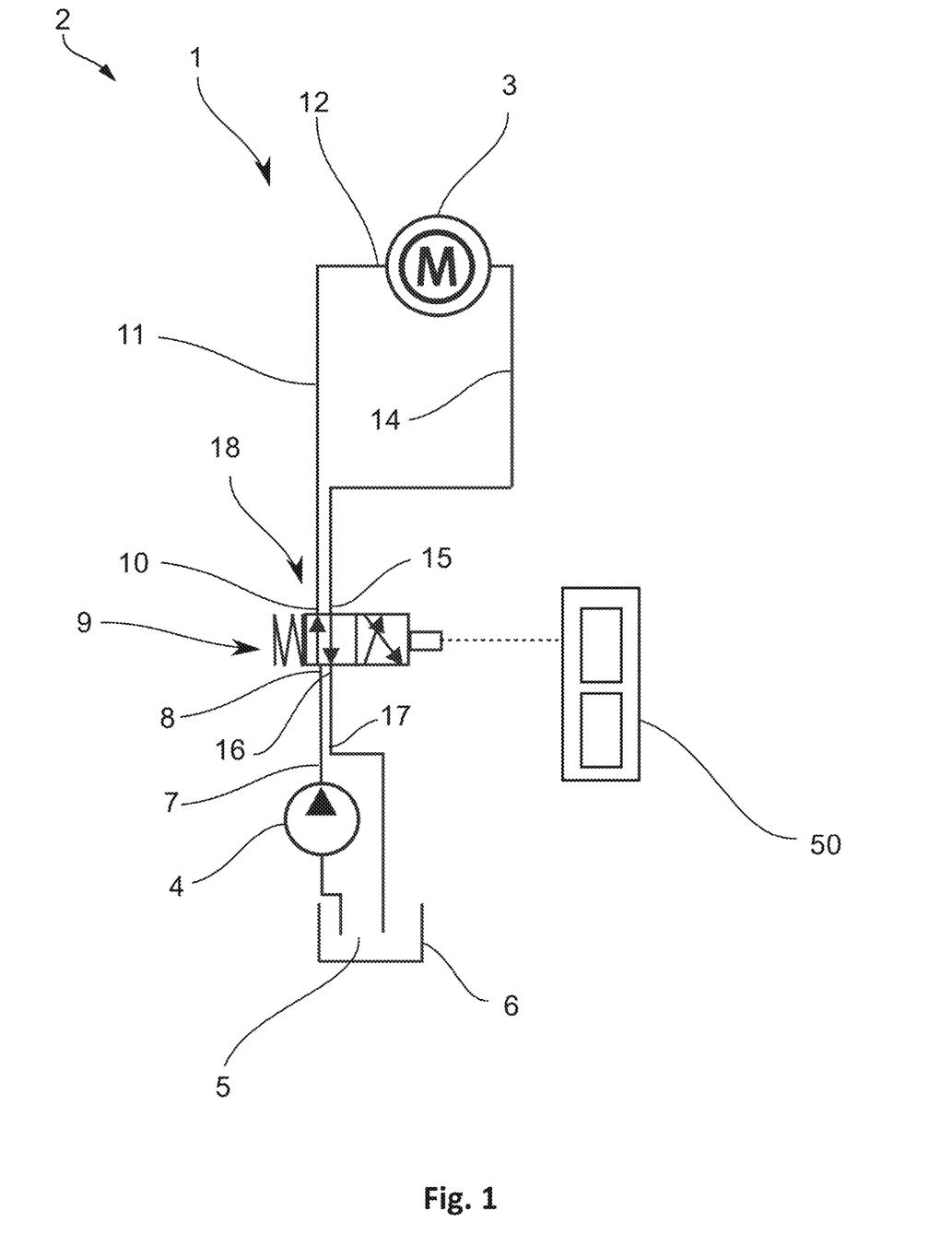
FIG. 1 shows a schematic hydraulic circuit diagram of a first embodiment of a hydraulic assembly of an electrically operable axle drive train with an electric machine and a first switching valve in a first operating position.

FIG. 1 shows a hydraulic assembly 1 of an electrically operable axle drive train 2 with at least one electric machine 3 and a control unit 50. The hydraulic assembly 1 comprises a first hydraulic pump 4 for conveying a first hydraulic fluid 5 from a hydraulic reservoir 6 into a first hydraulic path 7, which is coupled to a first hydraulic connection point 8 of a first switching valve 9. The switching valve 9 has a second hydraulic connection point 10, which is coupled to a second hydraulic path 11, which connects the second hydraulic connection point 10 to a first cooling fluid connection point 12 of the electric machine 3. The electric machine 3 has a second cooling fluid connection point 13, which is connected to a third hydraulic path 14, which is coupled to a third connection point 15 of the first switching valve 9. Furthermore, the first switching valve 9 has a fourth hydraulic connection point 16, which is coupled to a fourth hydraulic path 17, which opens into the hydraulic reservoir 6.

Figure 2:
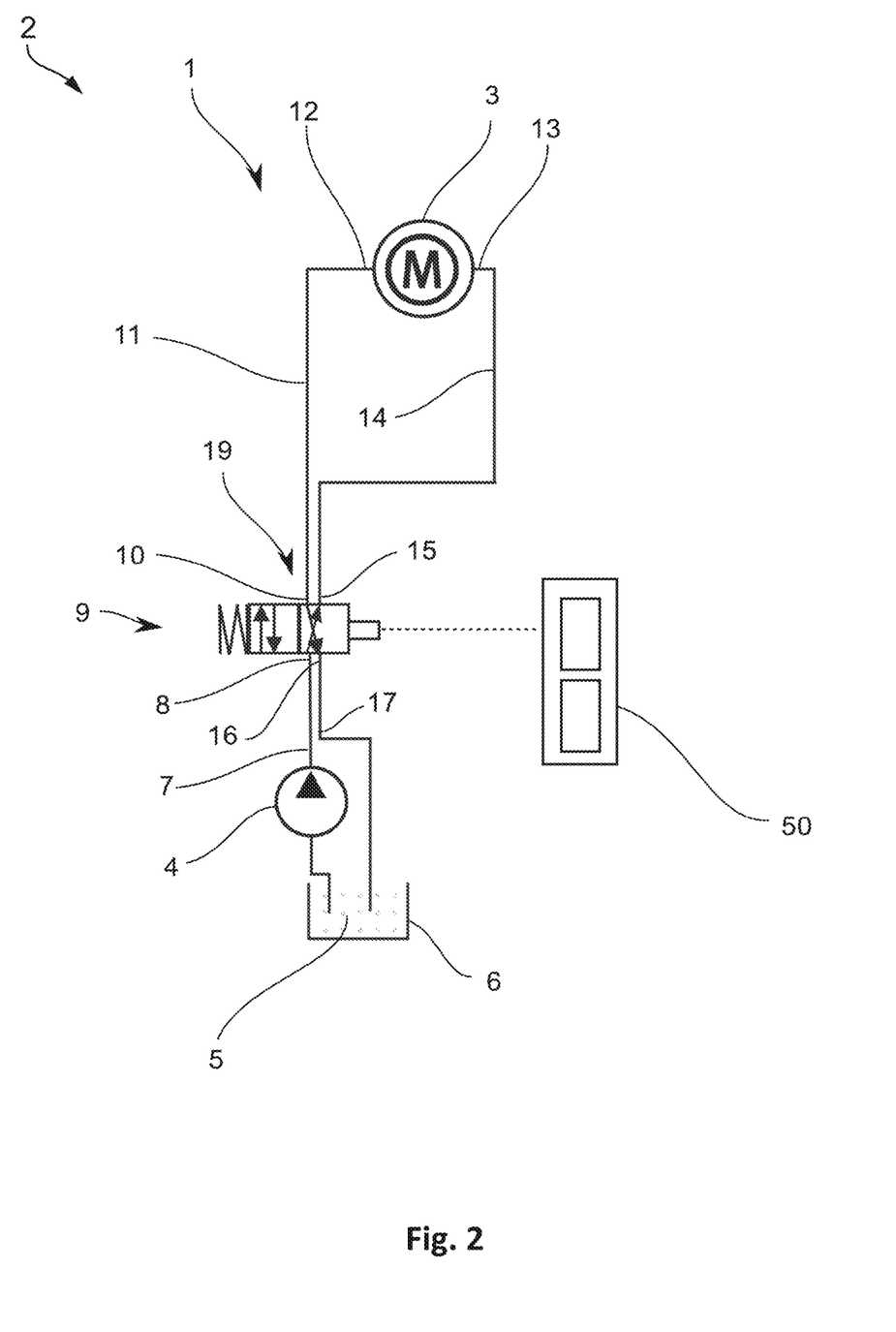
FIG. 2 shows a schematic hydraulic circuit diagram of a first embodiment of a hydraulic assembly of an electrically operable axle drive train with an electric machine and a first switching valve in a second operating position.

The first switching valve 9 can be moved via the control unit 50 into a first operating position 18, in which the first hydraulic connection point 8 is hydraulically connected to the second hydraulic connection point 10 and the third hydraulic connection point 15 is hydraulically connected to the fourth hydraulic connection point 16. This operating position is shown in FIG. 1. If the first switching valve 9 is now moved via the control unit 50 into a second operating position 19, in which the first hydraulic connection point 8 is hydraulically connected to the third hydraulic connection point 15, this results in a reversal of the direction of delivery of the hydraulic fluid 5 through the electric machine 3, as is shown in FIG. 2. In the second operating position 19 of the first switching valve 9, the second hydraulic connection point 10 is also hydraulically connected to the fourth hydraulic connection point 16, so that a coolant circuit can be formed once again.

Figure 3:
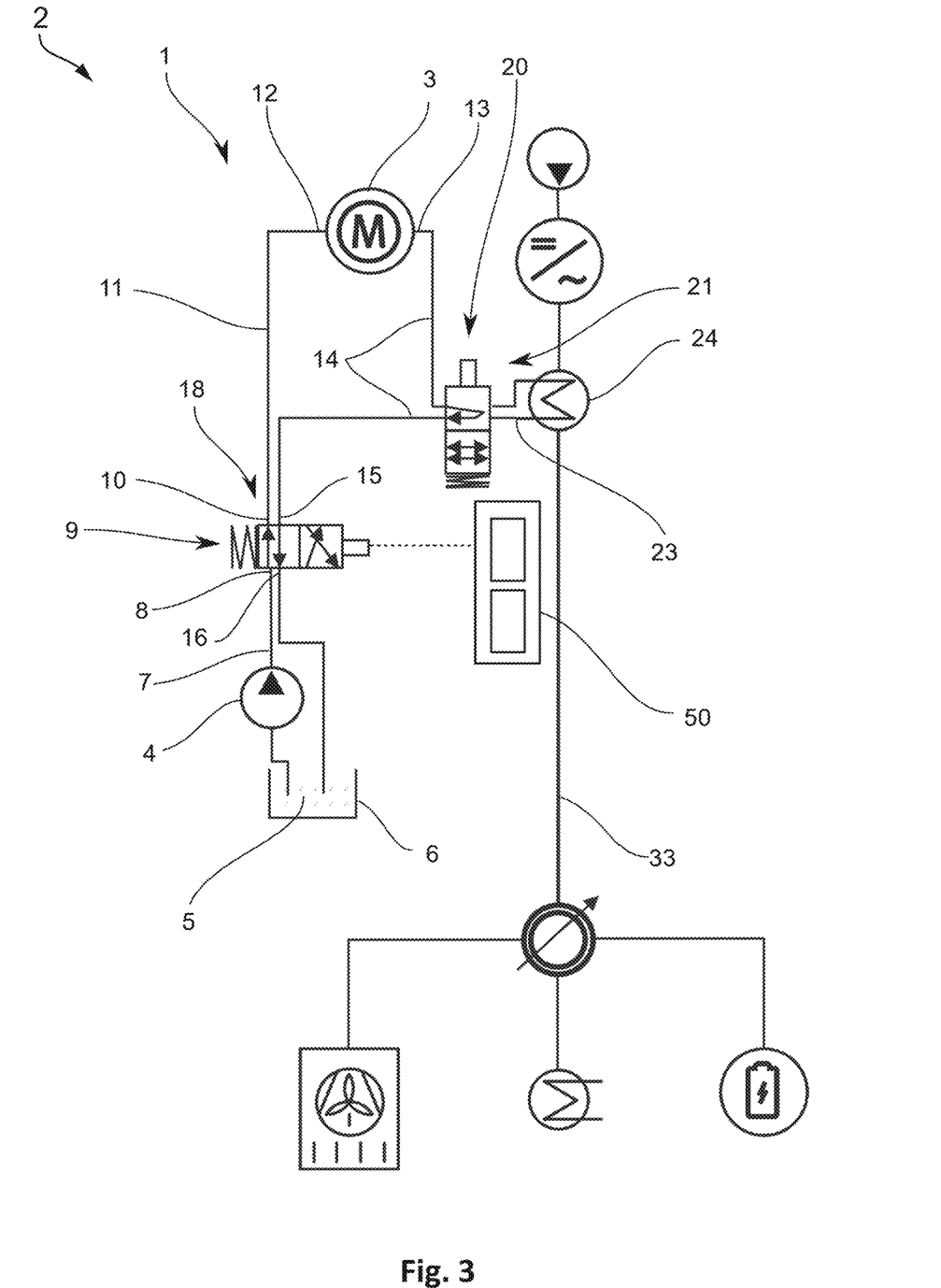
FIG. 3 shows a schematic hydraulic circuit diagram of a second embodiment of a hydraulic assembly of an electrically operable axle drive train with an electric machine, a first switching valve in a first operating position and a second switching valve in a first operating position.
Figure 4:
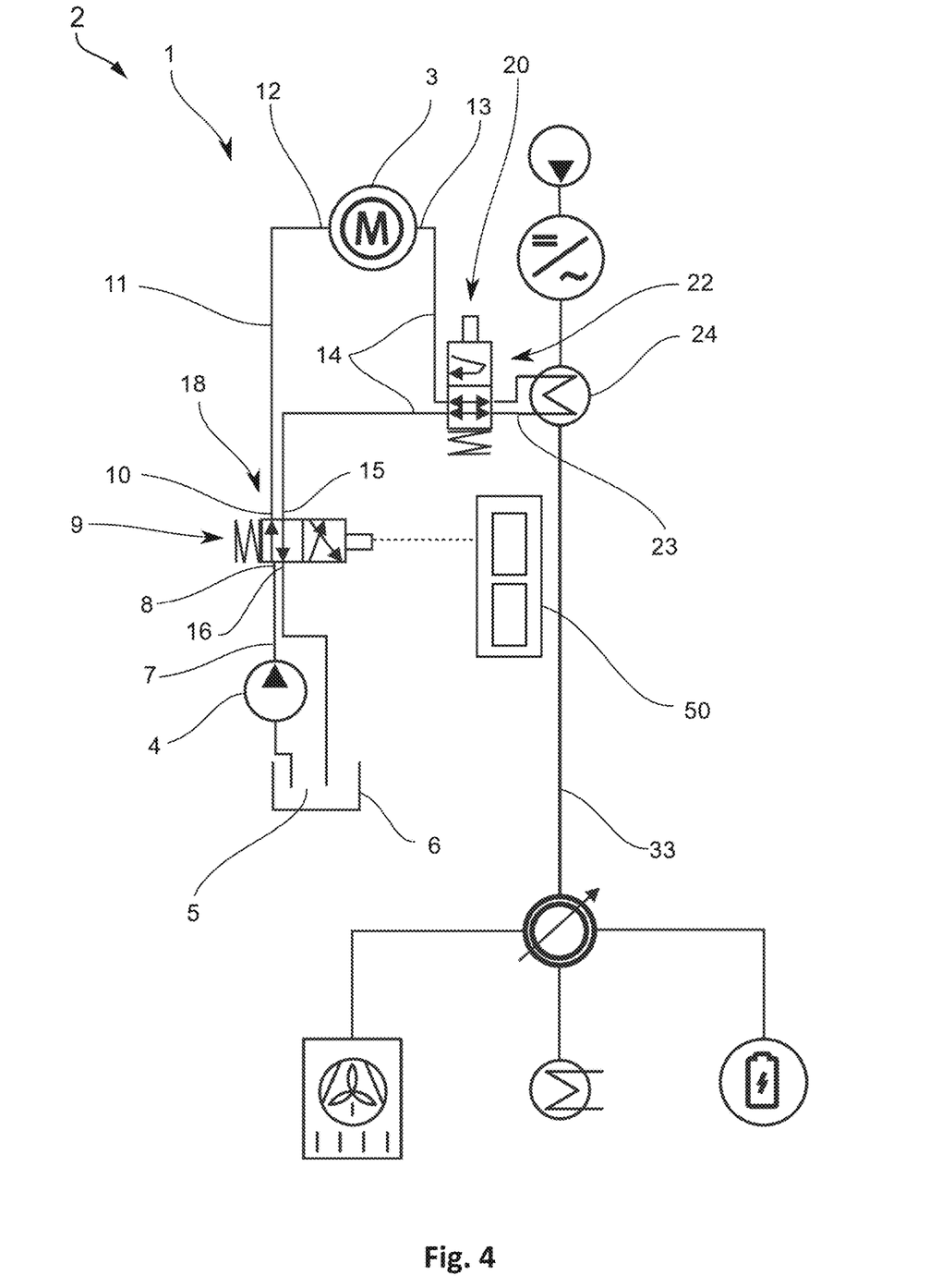
FIG. 4 shows a schematic hydraulic circuit diagram of a second embodiment of a hydraulic assembly of an electrically operable axle drive train with an electric machine, a first switching valve in a first operating position and a second switching valve in a second operating position.

FIG. 3 shows a coolant circuit expanded by a second switching valve 20, which is explained in more detail below. The second switching valve 20, which can be actuated via the control unit 50, is arranged in the third hydraulic path 14, which in a first operating position 21 loops through the third hydraulic path 14 and, in a second operating position 22, which is shown in FIG. 4, couples the third hydraulic path 14 to a fifth hydraulic path 23, in which a heat exchanger 24 is arranged. As a result, the cooling circuit of the electric machine 3 can optionally be connected to an additional heat exchanger 24, which can increase the cooling performance. The heat exchanger 24 is connected to a cooling water circuit 33, which in turn can, for example, heat a battery of the motor vehicle, be connected to another heat exchanger or be coupled to an air conditioning system of the motor vehicle, which is only indicated in the lower section of FIG. 3.

Although it is not shown in FIGS. 3-4, it goes without saying that it would of course also be possible in principle to move the first switching valve into its second operating position 19 and accordingly add two further operating modes to the embodiment shown in FIGS. 3-4.

Figure 5:
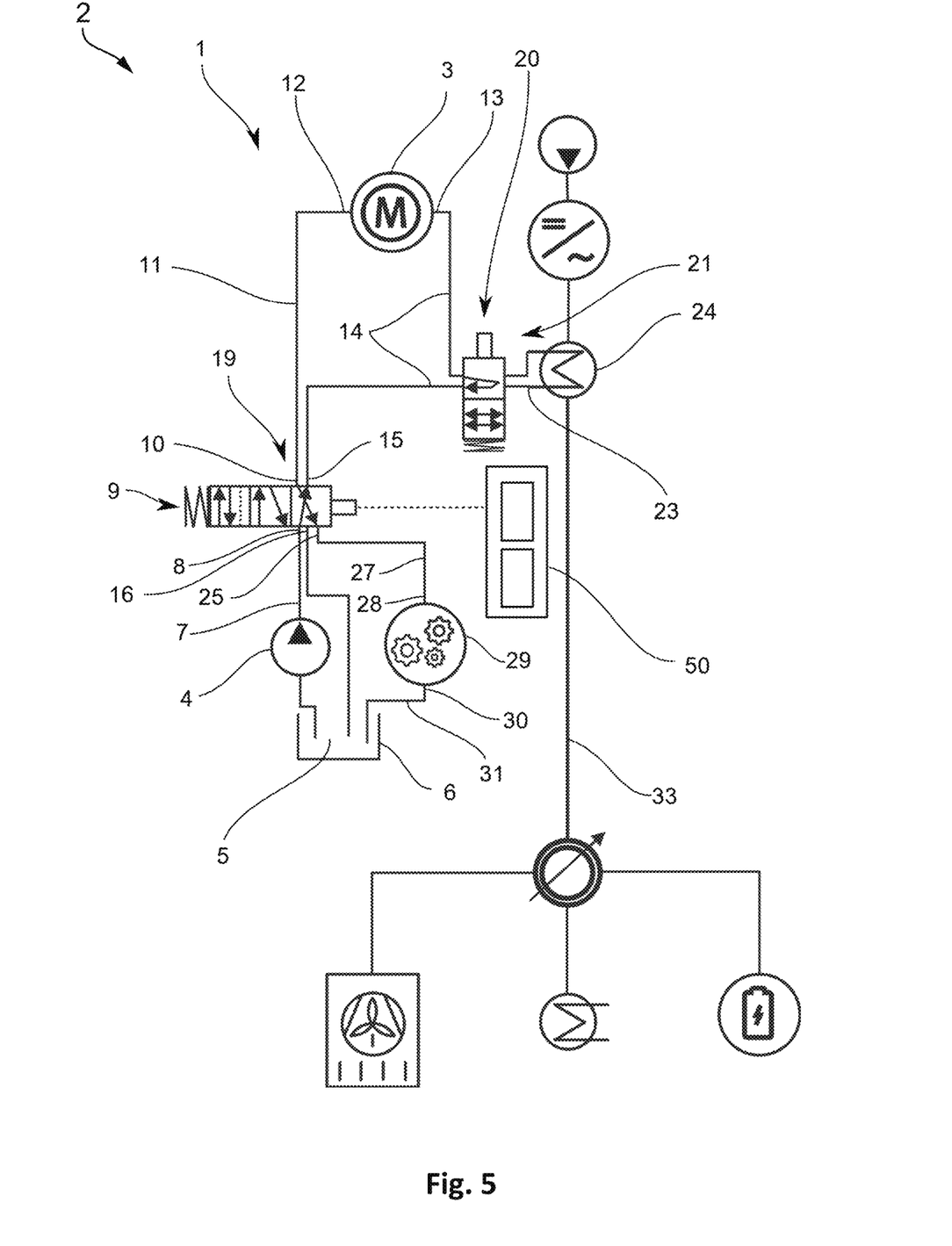
FIG. 5 shows a schematic hydraulic circuit diagram of a third embodiment of a hydraulic assembly of an electrically operable axle drive train with an electric machine, a transmission arrangement, a first switching valve in a first operating position and a second switching valve in a first operating position.

FIG. 5 shows a third embodiment of the hydraulic assembly 1, in which the first switching valve 9 has been expanded to include a further switching position and a transmission arrangement 29 has been added. This is now explained in more detail below. A fifth hydraulic connection point 25 is formed on the first switching valve 9, to which a sixth hydraulic path 27 is connected. The sixth hydraulic path 27 is connected to a first cooling fluid connection point 28 of a transmission arrangement 29, while a second cooling fluid connection point 30 of the transmission arrangement 29 is coupled to a seventh hydraulic path 31, which opens into the hydraulic reservoir 6. The first switching valve 9 can now be moved via the control unit 50 into a second operating position 19, in which the first hydraulic connection point 8 is hydraulically connected to the third hydraulic connection point 15 and the second hydraulic connection point 10 is hydraulically connected to the fifth hydraulic connection point 25.

Figure 6:
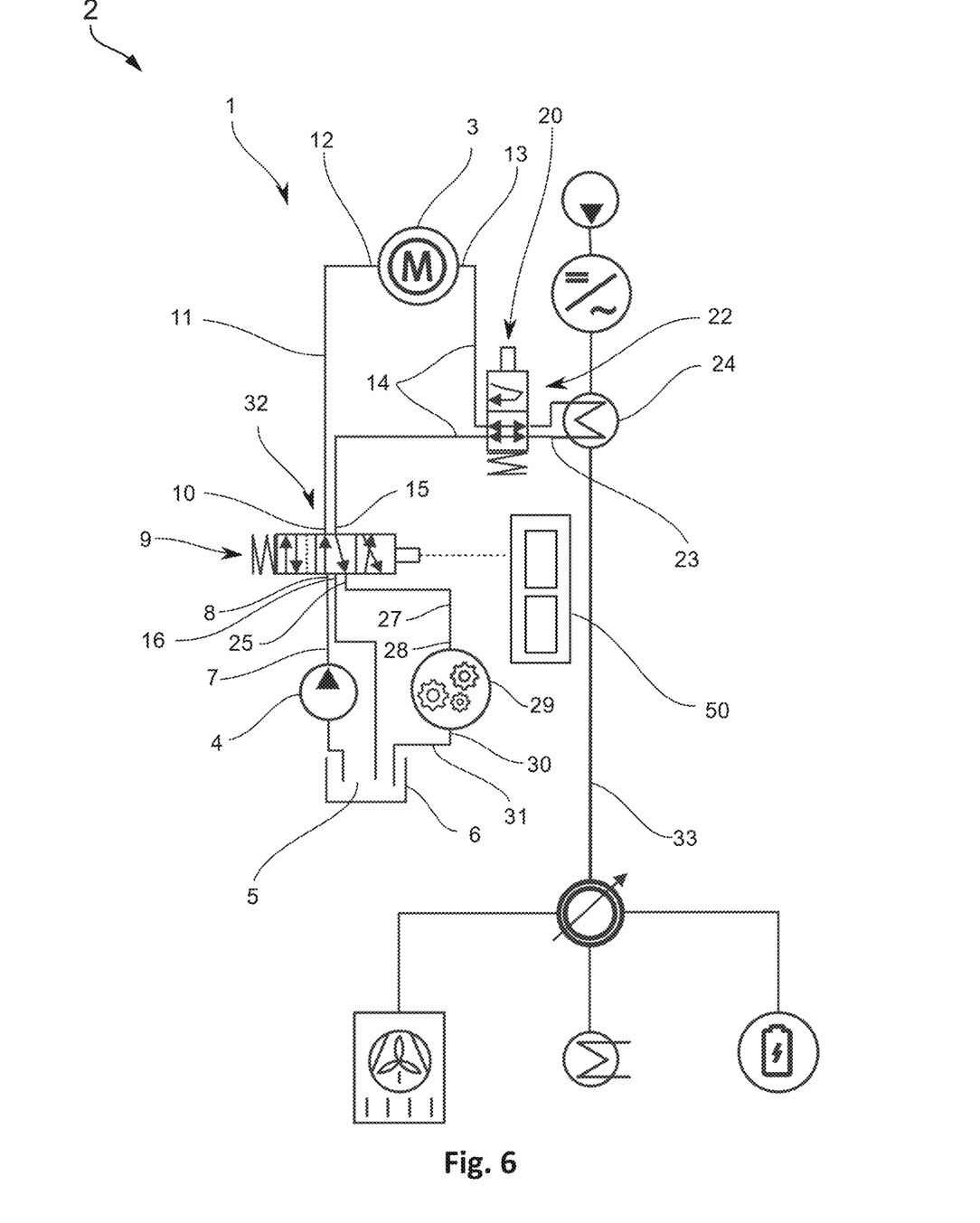
FIG. 6 shows a schematic hydraulic circuit diagram of a third embodiment of a hydraulic assembly of an electrically operable axle drive train with an electric machine, a transmission arrangement, a first switching valve in a second operating position and a second switching valve in a first operating position.

As shown in FIG. 6, the first switching valve 9 can also be moved via the control unit 50 into a third operating position 32, in which the first hydraulic connection point 8 is hydraulically connected to the second hydraulic connection point 10 and the third hydraulic connection point 15 is hydraulically connected to the fifth hydraulic connection point 25. It can be clearly seen from the synopsis of FIGS. 5-6 that a reversal of the flow direction of the hydraulic fluid 5 through the cooling circuit can be achieved.

Figure 7:
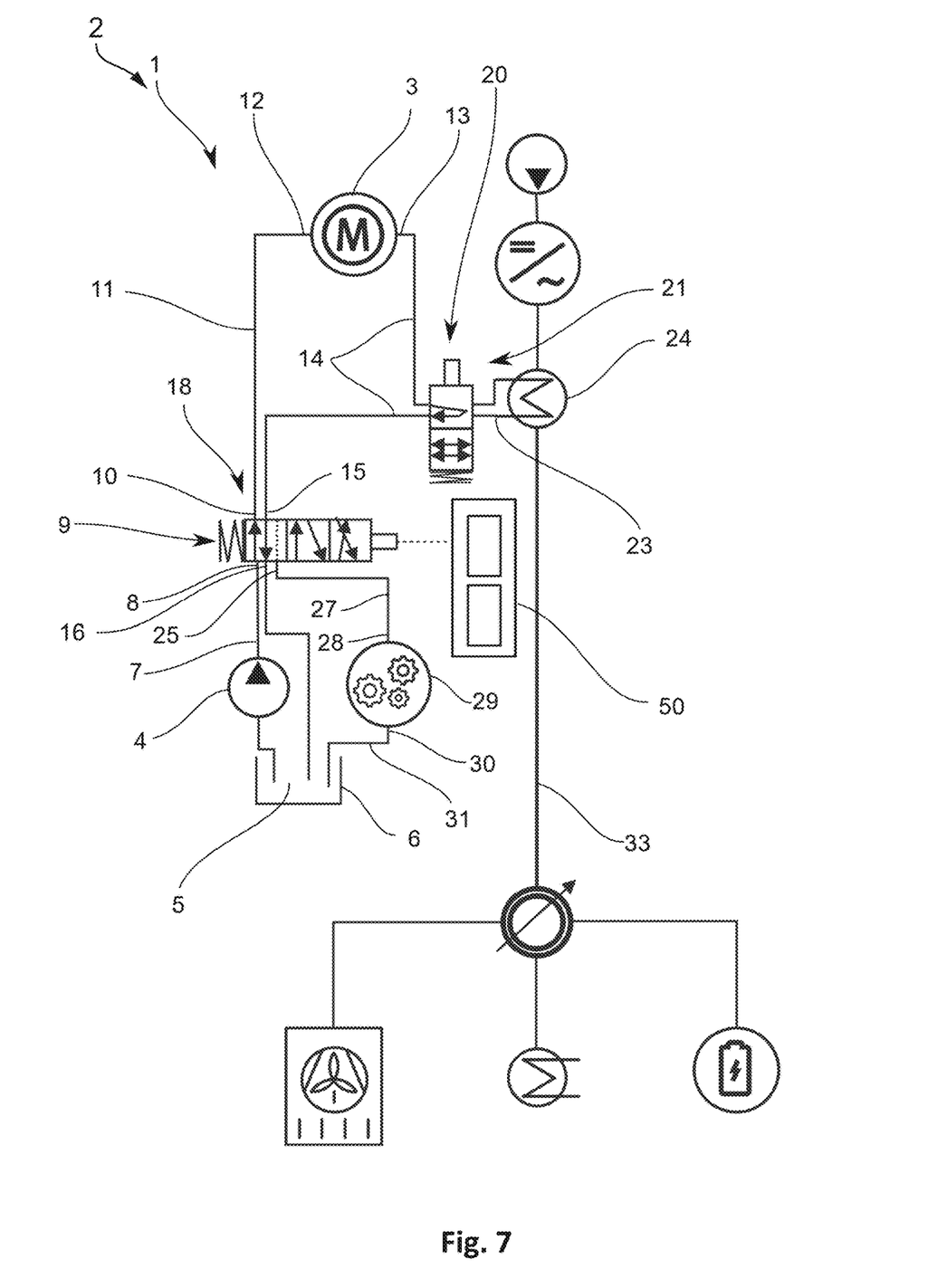
FIG. 7 shows a schematic hydraulic circuit diagram of a third embodiment of a hydraulic assembly of an electrically operable axle drive train with an electric machine, a transmission arrangement, a first switching valve in a third operating position and a second switching valve in a second operating position.

The control unit 50 is therefore configured to move the hydraulic assembly 1 into a first operating mode, in which the first switching valve 9 is moved into its first operating position 18 and the second switching valve 20 is moved into its first operating position 21, as shown in FIGS. 3 and 7. Here, in particular, the electric machine 3 can be self-heating.

Furthermore, the control unit 50 is configured to move the hydraulic assembly 1 into a second operating mode, in which the first switching valve 9 is moved into its first operating position 18 and the second switching valve 20 is moved into its second operating position 22, as shown, by way of example, in FIG. 4. In this second operating mode, the excess heat is removed from the electric machine 3 via the heat exchanger 24, which leads to a greater cooling capacity compared to the first operating mode.

The control unit 50 can also be configured to move the hydraulic assembly 1 into a third operating mode, in which the first switching valve 9 is moved into its second operating position 19 and the second switching valve 20 is moved into its first operating position 21, which can also be seen by way of example in FIG. 5. In the third operating mode, the electric machine 3 is initially cooled with hydraulic fluid 5 supplied from the hydraulic reservoir 6, wherein the hydraulic fluid 5 heated in this way by the electric machine 3 is subsequently used to lubricate the transmission arrangement 29.

Figure 8:
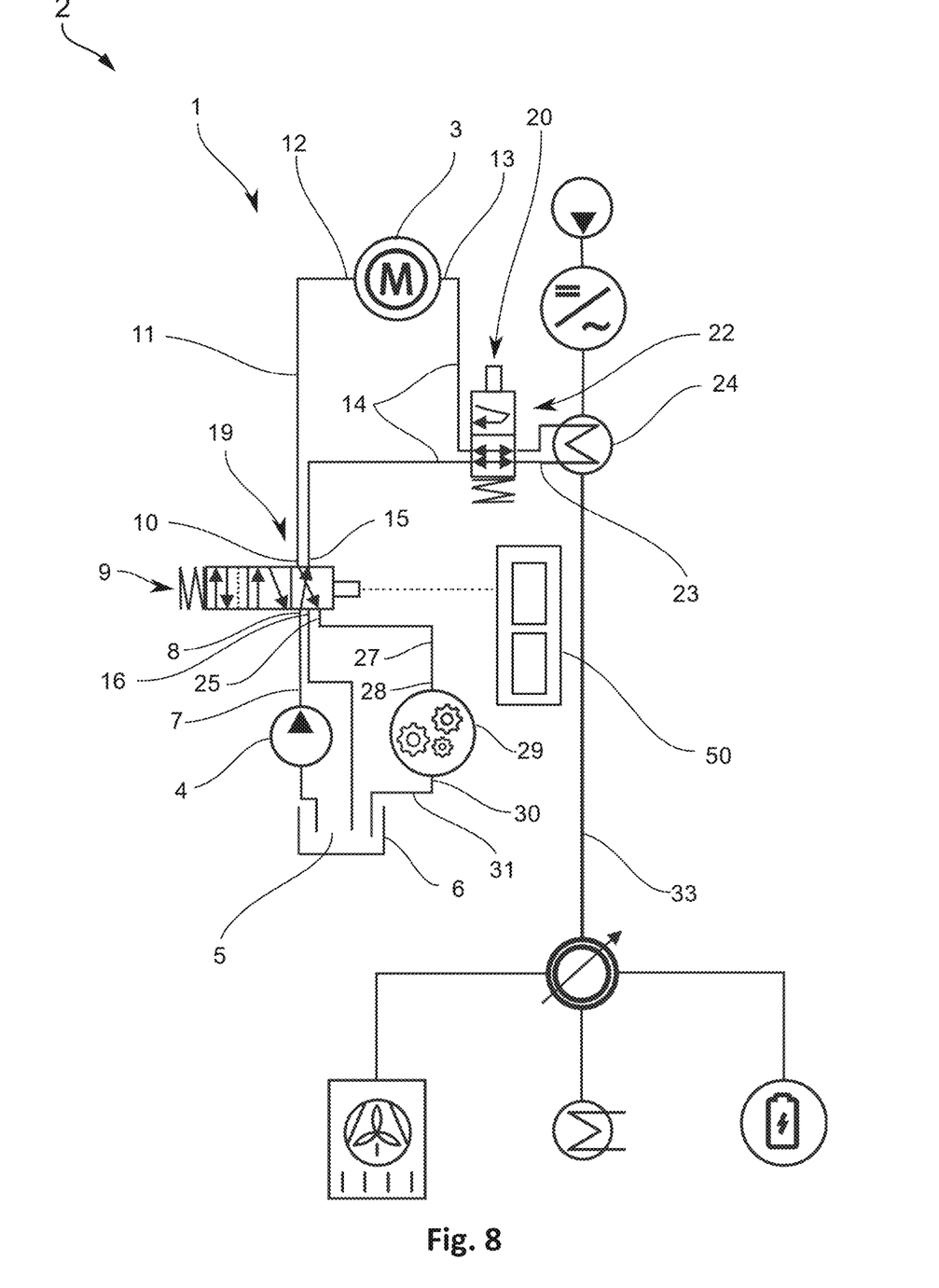
FIG. 8 shows a schematic hydraulic circuit diagram of a third embodiment of a hydraulic assembly of an electrically operable axle drive train with an electric machine, a transmission arrangement, a first switching valve in a third operating position and a second switching valve in a first operating position.

FIG. 8 now shows that the control unit 50 can also be configured to move the hydraulic assembly 1 into a fourth operating mode, in which the first switching valve 9 is moved into its second operating position 19 and the second switching valve 20 is moved into its second operating position 22. As a result, the hydraulic fluid 5 can first be passed through the heat exchanger 24 before entering the electric machine 3 and thus further cooled in order to be able to provide improved cooling performance for the electric machine 3.

Figure 9:
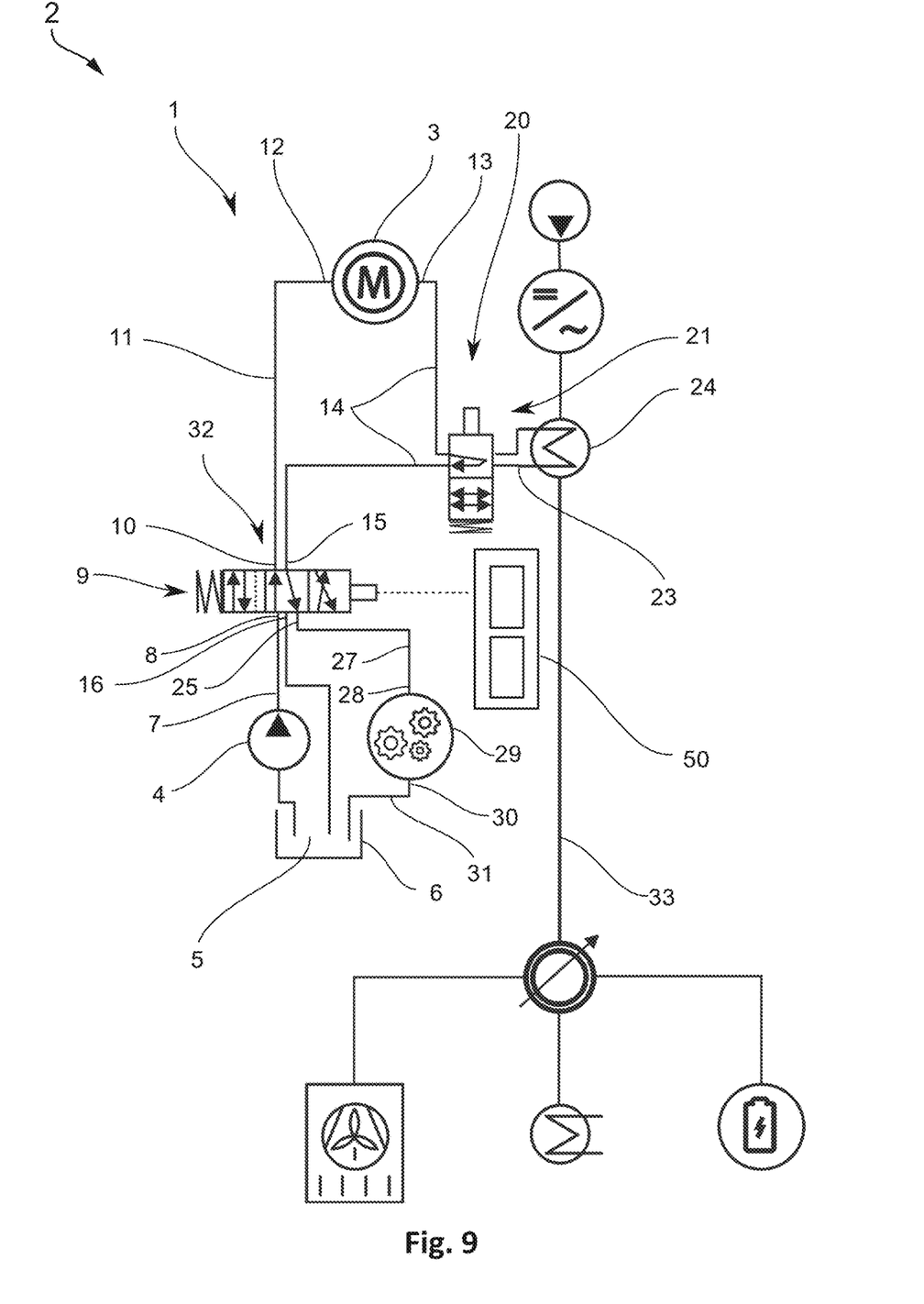
FIG. 9 shows a schematic hydraulic circuit diagram of a third embodiment of a hydraulic assembly of an electrically operable axle drive train with an electric machine, a transmission arrangement, a first switching valve in a second operating position and a second switching valve in a second operating position.

The control unit 50 is also configured to move the hydraulic assembly 1 into a fifth operating mode, in which the first switching valve 9 is moved into its third operating position 32 and the second switching valve 20 is moved into its first operating position 21, as also shown in FIG. 9. Compared to the third and fourth operating modes, the fifth operating mode can once again implement a reversal of the flow direction of the hydraulic fluid 5 through the cooling circuit. This initially results in cooling of the electric machine 3, wherein the hydraulic fluid 5 heated by the electric machine 3 is then subsequently supplied to the transmission arrangement 29, where the hydraulic fluid 5 can be cooled down before the hydraulic fluid 5 is once again supplied to the hydraulic reservoir 6.

Figure 10:
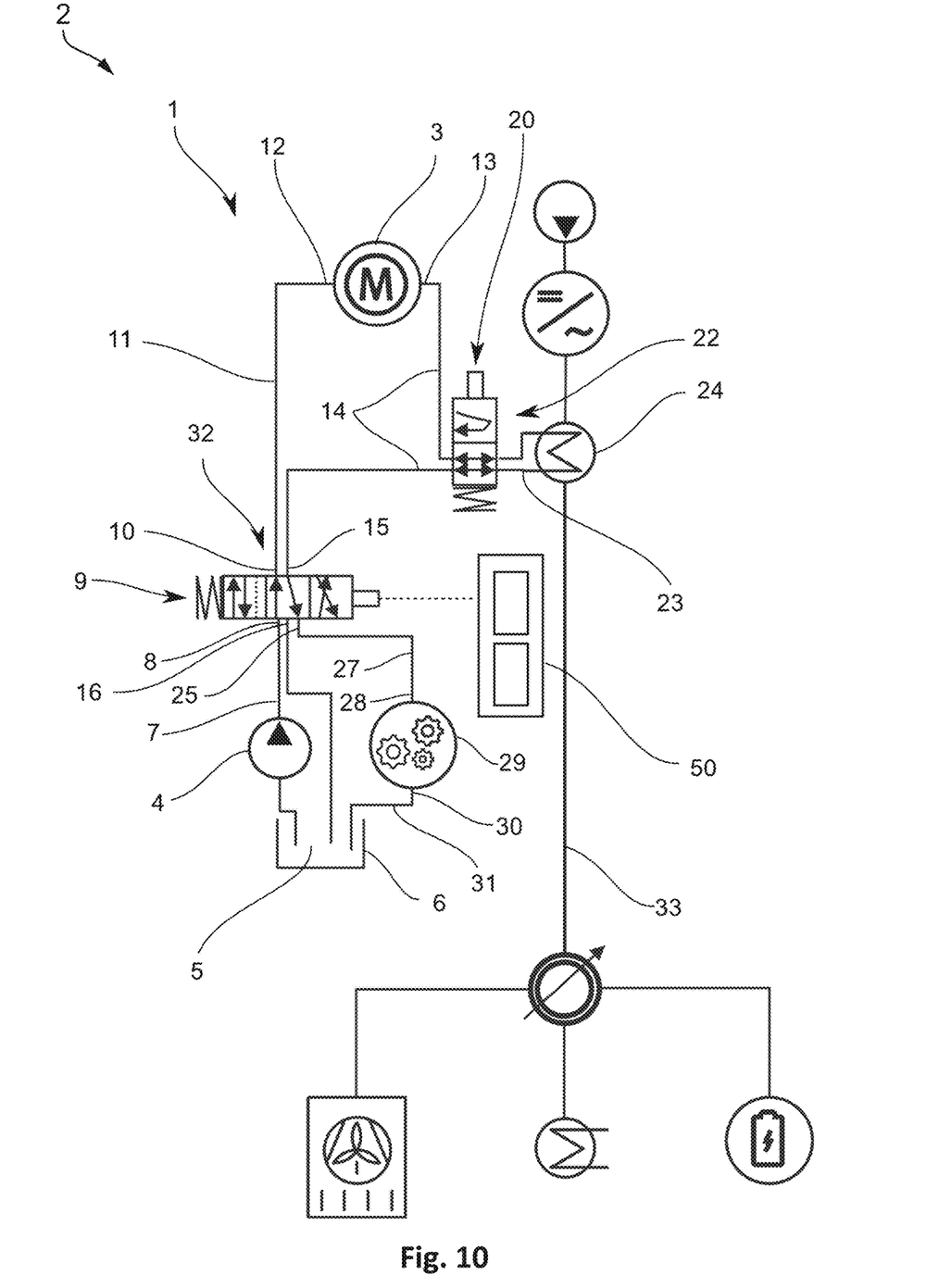
FIG. 10 shows a schematic hydraulic circuit diagram of a third embodiment of a hydraulic assembly of an electrically operable axle drive train with an electric machine, a transmission arrangement, a first switching valve in a second operating position and a second switching valve in a first operating position.

Finally, it is also possible to configure the control unit 50 so that the hydraulic assembly 1 can be moved into a sixth operating mode, in which the first switching valve 9 is moved into its third operating position 32 and the second switching valve 20 is moved into its second operating position 22. This is shown in FIG. 10. It can be clearly seen that by incorporating the heat exchanger 24 into the cooling circuit, the hydraulic fluid 5 can be cooled before entering the transmission arrangement 29. This achieves maximum cooling of the electric machine 3 as well as downstream cooling of the transmission arrangement 29.

LIST OF REFERENCE SYMBOLS

1 Hydraulic assembly
2 Axle drive train
3 Electric machine
4 Hydraulic pump
5 Control unit
6 Hydraulic reservoir
7 Hydraulic path
8 Hydraulic connection point
9 Switching valve
10 Hydraulic connection point
11 Hydraulic path
12 Cooling fluid connection point
13 Cooling fluid connection point
14 Hydraulic path
15 Connection
16 Hydraulic connection point
17 Hydraulic path
18 Operating position
19 Operating position
20 Switching valve
21 Operating position
22 Operating position
23 Hydraulic path
24 Heat exchanger
25 Hydraulic connection point
27 Hydraulic path
28 Cooling fluid connection point
29 Transmission arrangement
30 Cooling fluid connection point
31 Hydraulic path
32 Operating position
33 Cooling water circuit
50 Control unit
60 Operating mode

The invention claimed is:

1. A hydraulic assembly of an electrically operable axle drive train having at least one electric machine and having a control unit, the hydraulic assembly comprising:
a first hydraulic pump for conveying a first hydraulic fluid from a hydraulic reservoir into a first hydraulic path, which is coupled to a first hydraulic connection point of a first switching valve, wherein the switching valve has a second hydraulic connection point, which is coupled to a second hydraulic path, the second hydraulic path connecting the second hydraulic connection point to a first cooling fluid connection point of the electric machine, and the electric machine including a second cooling fluid connection point, which is connected to a third hydraulic path coupled to a third connection point of the first switching valve, wherein the first switching valve has a fourth hydraulic connection point, which is coupled to a fourth hydraulic path leading into the hydraulic reservoir, wherein the first switching valve can be moved via the control unit into a first operating position, in which the first hydraulic connection point is hydraulically connected to the second hydraulic connection point and the third hydraulic connection point is hydraulically connected to the fourth hydraulic connection point, and the first switching valve can be moved via the control unit into a second operating position, in which the first hydraulic connection point is hydraulically connected to the third hydraulic connection point, and wherein a second switching valve which can be actuated via the control unit is arranged in the third hydraulic path, which in a first operating position loops through the third hydraulic path, and in a second operating position couples the third hydraulic path to a fifth hydraulic path, in which a heat exchanger is arranged.

2. The hydraulic assembly according to claim 1, wherein a fifth hydraulic connection point is formed at the first switching valve, to which a sixth hydraulic path is connected, wherein the sixth hydraulic path is connected to a first cooling fluid connection point of a transmission arrangement, and a second cooling fluid connection point of the transmission arrangement is coupled to a seventh hydraulic path, which opens into the hydraulic reservoir, wherein the first switching valve can be moved via the control unit into a second operating position, in which the first hydraulic connection point is hydraulically connected to the third hydraulic connection point and the second hydraulic connection point is hydraulically connected to the fifth hydraulic connection point.

3. The hydraulic assembly according to claim 2, wherein the first switching valve can be moved via the control unit into a third operating position, in which the first hydraulic connection point is hydraulically connected to the second hydraulic connection point and the third hydraulic connection point is hydraulically connected to the fifth hydraulic connection point.

4. The hydraulic assembly according to claim 2, wherein the transmission arrangement is a planetary gearing.

5. The hydraulic assembly according to claim 1, wherein the heat exchanger is connected to a cooling water circuit.

6. The hydraulic assembly according to claim 1, wherein the control unit is configured to move the hydraulic assembly into a first operating mode, in which the first switching valve is moved into its first operating position and the second switching valve is moved into its first operating position.

7. The hydraulic assembly according to claim 1, wherein the control unit is configured to move the hydraulic assembly into a second operating mode, in which the first switching valve is moved into its first operating position and the second switching valve is moved into its second operating position.

8. The hydraulic assembly according to claim 1, wherein the control unit is configured to move the hydraulic assembly into a third operating mode, in which the first switching valve is moved into its second operating position and the second switching valve is moved into its first operating position.

9. The hydraulic assembly according to claim 1, wherein the control unit is configured to move the hydraulic assembly into a fourth operating mode, in which the first switching valve is moved into its second operating position and the second switching valve is moved into its second operating position.

10. The hydraulic assembly according to claim 1, wherein the control unit is configured to move the hydraulic assembly into a fifth operating mode, in which the first switching valve is moved into its third operating position and the second switching valve is moved into its first operating position.

11. The hydraulic assembly according to claim 1, wherein the control unit is configured to move the hydraulic assembly into a sixth operating mode, in which the first switching valve is moved into its third operating position and the second switching valve is moved into its second operating position.

12. An electrically operable axle drive train having at least one electric machine, a hydraulic assembly, and a control unit, the hydraulic assembly comprising:
   a first hydraulic pump for conveying a first hydraulic fluid from a hydraulic reservoir into a first hydraulic path coupled to a first hydraulic connection point of a first switching valve;
   wherein the switching valve has a second hydraulic connection point coupled to a second hydraulic path, the second hydraulic path connecting the second hydraulic connection point to a first cooling fluid connection point of the electric machine, and the electric machine including a second cooling fluid connection point connected to a third hydraulic path coupled to a third connection point of the first switching valve;
   wherein the first switching valve has a fourth hydraulic connection point coupled to a fourth hydraulic path leading into the hydraulic reservoir;
   wherein the first switching valve can be moved via the control unit into a first operating position, in which the first hydraulic connection point is hydraulically connected to the second hydraulic connection point and the third hydraulic connection point is hydraulically connected to the fourth hydraulic connection point, and the first switching valve can be moved via the control unit into a second operating position, in which the first hydraulic connection point is hydraulically connected to the third hydraulic connection point; and
   wherein a second switching valve which can be actuated via the control unit is arranged in the third hydraulic path, which in a first operating position loops through the third hydraulic path, and in a second operating position couples the third hydraulic path to a fifth hydraulic path, in which a heat exchanger is arranged.

13. The electrically operable drive train according to claim 12, wherein a fifth hydraulic connection point is formed at the first switching valve, to which a sixth hydraulic path is connected, wherein the sixth hydraulic path is connected to a first cooling fluid connection point of a transmission arrangement, and a second cooling fluid connection point of the transmission arrangement is coupled to a seventh hydraulic path), which opens into the hydraulic reservoir, wherein the first switching valve can be moved via the control unit into a second operating position, in which the first hydraulic connection point is hydraulically connected to the third hydraulic connection point and the second hydraulic connection point is hydraulically connected to the fifth hydraulic connection point.

14. The electrically operable drive train according to claim 13, wherein the first switching valve can be moved via the control unit into a third operating position, in which the first hydraulic connection point is hydraulically connected to the second hydraulic connection point and the third hydraulic connection point is hydraulically connected to the fifth hydraulic connection point.

15. The electrically operable drive train according to claim 13, wherein the transmission arrangement is a planetary gearing.

16. The electrically operable drive train according to claim 12, wherein the heat exchanger is connected to a cooling water circuit.

17. The electrically operable drive train according to claim 12, wherein the control unit is configured to move the hydraulic assembly into a first operating mode, in which the first switching valve is moved into its first operating position and the second switching valve is moved into its first operating position.

18. The electrically operable drive train according to claim 12, wherein the control unit is configured to move the hydraulic assembly into a second operating mode, in which the first switching valve is moved into its first operating position and the second switching valve is moved into its second operating position.

* * * * *